(12) United States Patent
Fraisse et al.

(10) Patent No.: US 9,188,438 B2
(45) Date of Patent: Nov. 17, 2015

(54) METHOD FOR DETECTING SHIFTS IN LINE IMAGES OBTAINED BY A SENSOR THAT IS AIRBORNE OR MOVING IN SPACE

(75) Inventors: Renaud Fraisse, Toulouse (FR); Vincent Crombez, Lacroix-Falgarde (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 762 days.

(21) Appl. No.: 13/387,156

(22) PCT Filed: Jul. 28, 2010

(86) PCT No.: PCT/EP2010/060988
§ 371 (c)(1),
(2), (4) Date: Feb. 29, 2012

(87) PCT Pub. No.: WO2011/012663
PCT Pub. Date: Feb. 3, 2011

(65) Prior Publication Data
US 2012/0148113 A1  Jun. 14, 2012

(30) Foreign Application Priority Data
Jul. 31, 2009  (FR) ...................................... 09 55396

(51) Int. Cl.
*G06K 9/00* (2006.01)
*G01C 11/02* (2006.01)
*G06T 7/00* (2006.01)

(52) U.S. Cl.
CPC ............ *G01C 11/025* (2013.01); *G06T 7/0026* (2013.01); *G06T 2207/10032* (2013.01); *G06T 2207/30181* (2013.01)

(58) Field of Classification Search
None
See application file for complete search history.

(56) References Cited

U.S. PATENT DOCUMENTS 5,692,062 A * 11/1997 Lareau et al. ................. 382/107
8,559,757 B1 * 10/2013 Kia et al. ...................... 382/294
(Continued)

FOREIGN PATENT DOCUMENTS

FR        2 899 344        10/2007

OTHER PUBLICATIONS

Capel, "Chapter 3 Registration: Geometric and Photometric" and "Chapter 4 Image Mosaicing", in Springer-verlage: 'Image Mosaicing and Super-resolution', 2004, pp. 17-79.*

(Continued)

*Primary Examiner* — Jason Heidemann
(74) *Attorney, Agent, or Firm* — Young & Thompson

(57) ABSTRACT

Method for estimating shifts of line images obtained by an airborne or spaceborne scanning sensor. The invention relates to a method for estimating shifts in line images of an image, referred to as a "composite image", made up of the juxtaposition of J line images. The line images show portions of a scene on the surface (S) of a celestial body that are different and successively acquired by a row of sensitive cells of a sensor (10) on board a vehicle flying over the celestial body. The shifts in the line images are induced by sighting errors of the sensor (10) during the acquisition of the line image $L_j$. The lateral and/or longitudinal shift of a line image $L_j$ relative to a line image $L_i$, where j is different from i, is estimated according to a local model of lateral and/or longitudinal variation of the similarity between different line images.

8 Claims, 2 Drawing Sheets

(56) References Cited

U.S. PATENT DOCUMENTS

Figure 1:
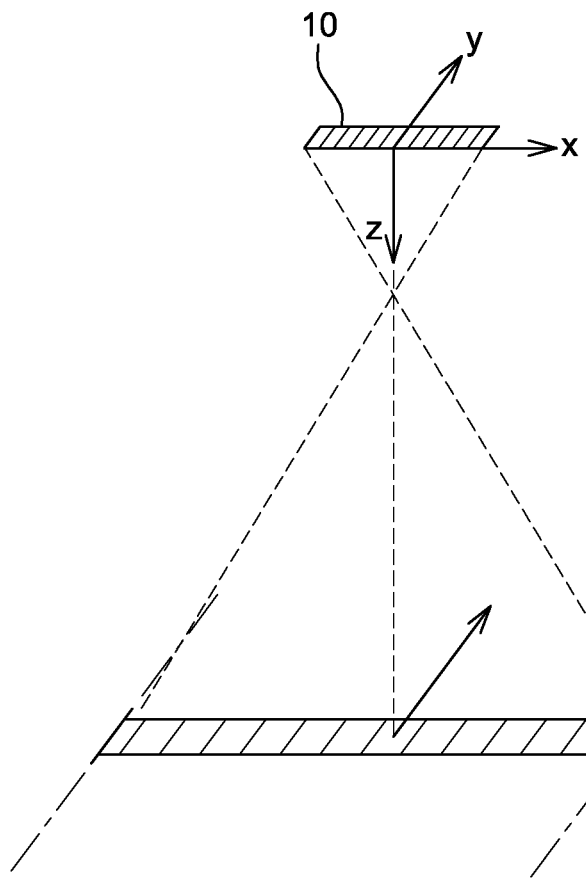

| | | | | |
|---|---|---|---|---|
| 2003/0190091 A1* | 10/2003 | Stewart et al. | ............... | 382/294 |
| 2004/0071367 A1* | 4/2004 | Irani et al. | ................ | 382/284 |
| 2005/0271300 A1* | 12/2005 | Pina | ........................ | 382/294 |
| 2006/0146377 A1* | 7/2006 | Marshall et al. | ............ | 358/486 |
| 2008/0031528 A1* | 2/2008 | Crombez et al. | ............ | 382/232 |

OTHER PUBLICATIONS

Song et al."Automatic Alignment of Images with Small Overlaps, Sparse Features and Repeated Deceptive Objects", Aug. 18-21, 2007, Proceedings of the IEEE International Conference on Automation and Logistics, pp. 1919-1924.*

Yang et al., Covariance-Driven Mosaic Formation from Sparsely-Overlapping Image Sets with Application to Retinal Image Mosaicing, Jul. 2004, IEEE Computer Society Conference on Computer Vision and Pattern Recognition (CVPR'04), pp. 1-7.*

International Search Report dated Oct. 8, 2010, corresponding to PCT/EP2010/060988.

Tchernykh, et al.; "Airborne test results for smart pushbroom imaging system with optoelectronic image correction"; Proceedings of the SPIE—The International Society for Optical Engineering; vol. 5234 No. 1; Jan. 1, 2004; pp. 550-559.

* cited by examiner

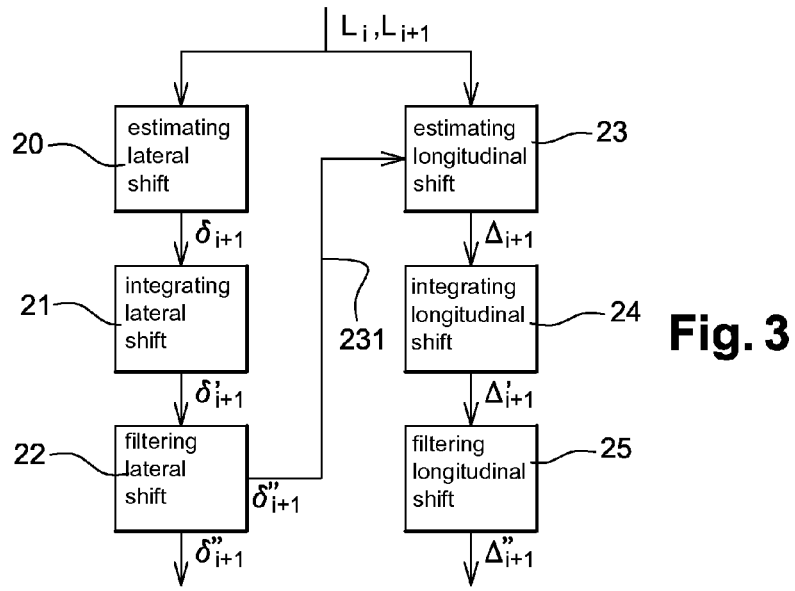
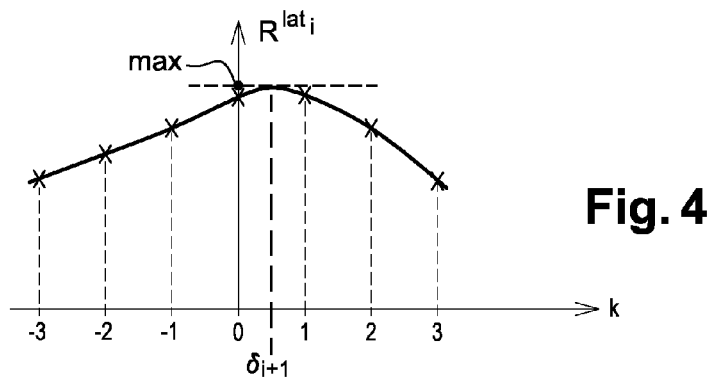
Fig. 3
Fig. 4
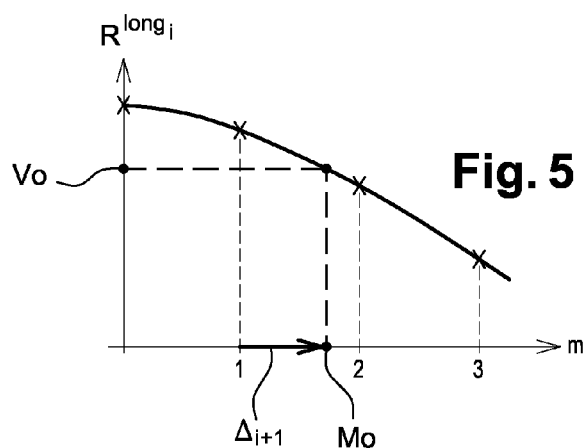
Fig. 5
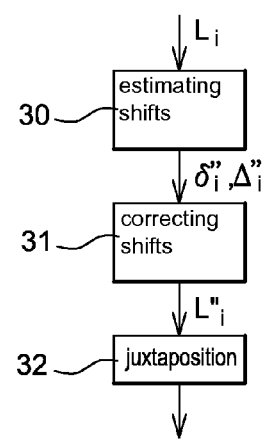
Fig. 6

METHOD FOR DETECTING SHIFTS IN LINE IMAGES OBTAINED BY A SENSOR THAT IS AIRBORNE OR MOVING IN SPACE

The present invention relates to the field of the exploitation of images obtained by a scanning sensor on board a vehicle flying over a celestial body. More specifically, this invention concerns a method for estimating shifts in line images showing different portions of a scene on the surface of the celestial body.

A scanning sensor (known as "push broom") usually contains a plurality of sensitive cells arranged in a line. The sensors line of sight is oriented towards the surface of the celestial body observed, for example the Earth, and forms a plane, referred to as a "plane of sight", with the row of sensitive cells.

By scanning the sensor's plane of sight over a scene on the Earth's surface, line images corresponding to different portions of the scene, comprising a plurality of pixels produced by the sensor's different sensitive cells, are acquired successively. The line images are intended to be juxtaposed, so as to form an image, referred to as a "composite image", showing all or part of the scene.

Juxtaposition means the operation that consists of forming a composite image, composed of a two-dimensional pixel matrix, from line images acquired successively, such that the rows of the composite image's pixel matrix correspond to successive line images, and the columns of the composite image are, by definition, made up of all the pixels with the same index in the different line images.

The scanning of the sensor's plane of sight is performed, for instance, by moving the vehicle relative to the Earth, in which case the sensor is usually stationary in a reference frame associated to the vehicle and is arranged transversely to the vehicle's trajectory relative to the Earth, preferably perpendicular to said trajectory for maximizing the instrument's scan swath.

FIG. 1 shows, schematically and in perspective, the overflight of a scene by a scanning sensor 10.

A reference frame comprising three axes X, Y, and Z, orthogonal to one another, is associated with the sensor 10, in which the X-axis is parallel to the axis of the row of sensitive cells of the sensor 10, the Y-axis is parallel to said sensors direction of movement, and the Z-axis is oriented towards the Earth, and forms an angle with a known value, possibly zero, with said sensors line of sight, in the absence of vibrations.

In general, the acquisition of line images by the sensor is simultaneous for each sensitive cell and with a substantially constant sampling period between two consecutive acquisitions.

Thus, during an observation sequence, successive line images show different successive portions of the scene observed, substantially aligned with respect to each other and with a substantially constant spatial interval between them (when the horizontal speed of the vehicle is substantially constant).

However, such sensors (airborne or spaceborne) are subjected to vibrations that induce undesirable movements in the line of sight, which result in gaps between the theoretical positions of the portions observed within the scene and their actual positions.

With respect to the line images, these gaps occur in the form of shifts between the position that a line image will occupy in the composite image (by simple juxtaposition of this line image, as previously mentioned) and the position it should occupy in said composite image, because of the sighting error induced by the undesirable movements in the line of sight of the sensor 10.

Figure 2:
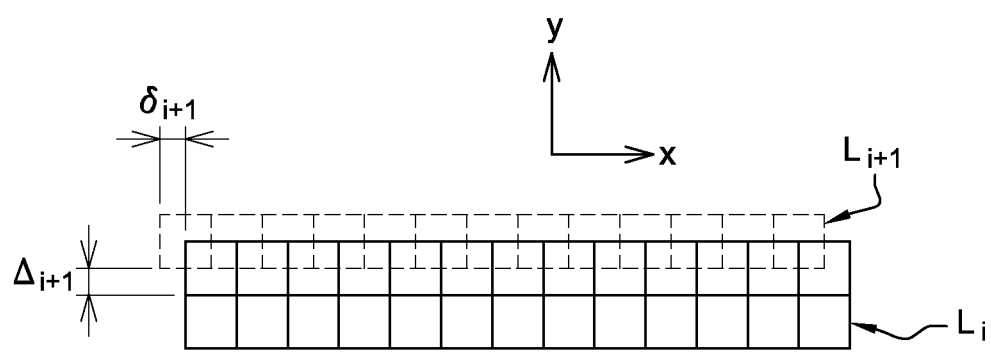

FIG. 2 shows, schematically and in solid lines, the positions of two consecutive line images $L_i$ and $L_{i+1}$ in a composite image. These are juxtaposed, by aligning the pixels. The position in the composite image that line $L_{i+1}$ should occupy, taking into account the fact that it shows a portion of the scene shifted substantially with respect to the portion theoretically targeted, is shown by dashed lines.

It is understood from this that geometric deformations will be induced in the composite image due to the shift of line image $L_{i+1}$.

Movements in the line of sight caused by low-frequency vibrations (in a range of zero Hertz to several tens of Hertz) are usually estimated during the acquisition by means of dedicated sensors, such as gyroscopes, so that it is possible to determine and correct the shifts of line images caused by the low-frequency vibrations.

In contrast, movements in the line of sight caused by high-frequency vibrations (in a range of several tens of Hertz to several thousand Hertz) are not determined during the acquisition by means of dedicated sensors, in particular because they do not correspond to movements of the vehicle as a whole but rather to local vibrations of the sensor and/or its mount.

From patent application FR 2 899 344 and patent application US 2008/031528, it is known to reconstitute an instrument's line of sight based on two images showing the same portion of an observed scene. Homologous characteristic areas, corresponding to the same point in the observed scene, are matched in each of these images. The line of sight is then reconstituted by comparing the positions of these characteristic areas in each of said images showing the same scene. For determining homologous characteristic areas corresponding to the same point of the observed scene, this solution is based on having at least two images showing the same portion of the scene. This solution cannot be applied to reconstituting the line of sight based on a composite image's line images, since said line images show different portions of the observed scene.

No solution is known that allows the shifts of a composite image's line images, acquired by a sensor that is airborne or spaceborne, to be corrected in the case where there are not at least two images showing the same portion of the observed scene.

The present invention proposes to solve the above-mentioned problems through a method for estimating shifts of line images of a composite image, made up of the juxtaposition of J line images, in which the line images show portions of a scene on the surface of a celestial body that are different and sequentially acquired by a row of sensitive cells of a sensor on board a vehicle flying over said celestial body, each line image being composed of a plurality of pixels, and a line image $L_j$, where $1 \leq j \leq J$, presents a lateral and/or longitudinal shift between the position that line image $L_j$ is destined to occupy in the composite image and the position it should occupy, because of a sighting error of the sensor during the acquisition of line image $L_j$.

According to the invention, the lateral and/or longitudinal shift of a line image $L_j$ relative to a line image $L_i$, where j is different from i, is determined according to a local model of lateral and/or longitudinal variation of the similarity between different line images.

Preferably, the local model of lateral and/or longitudinal variation of the similarity between different line images is determined by calculating similarity values between different line images of the composite image.

Preferably, the method for estimating shifts in line images comprises a step of estimating the relative lateral shift $\delta_j$ of line image $L_j$ relative to line image $L_i$, during which the local model of lateral variation of the similarity between successive line images is determined by calculating similarity values of line image $L_j$ to line image $L_i$ for a plurality of lateral translation values of one line relative to the other; the relative lateral shift $\delta_j$ is estimated as the lateral translation for which the value of the model of lateral variation of the similarity is maximum.

Preferably, the relative lateral shift $\delta_j$ of line image $L_j$, relative to a line image $L_i$, is estimated in the form of a relative integer number or a real number of pixels.

Preferably, the method for estimating shifts of line images comprises a step of integrating relative lateral shifts $\delta_j$ in successive line images, for determining cumulative lateral shifts $\delta'_j$ with respect to a reference line image.

Preferably, the method for estimating shifts of line images comprises a step of low-cut filtering of relative lateral shifts $\delta_j$ or cumulative lateral shifts $\delta'_j$.

Preferably, the method for estimating shifts of line images comprises a step of estimating the relative longitudinal shift $\Delta_j$ of line image $L_j$ relative to line image $L_i$, during which a similarity value is calculated for line image $L_j$ and line image $L_i$, and the relative longitudinal shift $\Delta_j$ is estimated according to the longitudinal gap corresponding, based on the local model of longitudinal variation of the similarity, to said similarity value for line image $L_j$ and line image $L_i$.

Preferably, when lateral shifts have already been estimated, the step estimating the relative longitudinal shift $\Delta_j$ is applied to line images $L'_j$ instead of line images $L_j$, where $1 \leq j \leq J$, said line images $L'_j$ corresponding to lines images $L_j$ after said estimated lateral shifts have been corrected.

Preferably, the local model of longitudinal variation of the similarity between successive line images is calculated, for a given theoretical longitudinal gap between two line images, by averaging similarity values calculated for a plurality of pairs of line images separated by said given theoretical longitudinal gap.

Preferably, the local model of longitudinal variation of the similarity between successive line images is calculated between the theoretical longitudinal gaps by interpolation according to the values calculated for the theoretical longitudinal gaps.

Preferably, the method for estimating shifts of line images comprises a step of integrating relative longitudinal shifts $\Delta_j$ in successive line images for determining cumulative longitudinal shifts $\Delta'_j$ with respect to a reference line image.

Preferably, the method for estimating shifts of line images comprises a step of low-cut filtering of relative or cumulative longitudinal shifts.

Preferably, line image $L_j$ and line image $L_i$ are consecutive line images and/or the steps of the estimation method are iterated at least once.

The invention also relates to a method for forming composite images from line images with shifts, comprising at least:
 a step of estimating shifts of line images utilizing the method for estimating shifts according to the invention,
 a step of correcting estimated shifts of line images,
 a step of juxtaposing corrected line images.

The invention also relates to a method for forming composite images from line images with shifts, comprising at least:
 a step of estimating shifts of a first set of line images acquired by a first sensor, utilizing the method for estimating shifts according to the invention,
 a step of converting estimated shifts in a second set of shifts for a second set of line images, acquired by a second sensor on board the vehicle and substantially subjected to the same sighting errors as the first sensor,
 a step of correcting the second set of shifts of the second set of line images, and a step of juxtaposing the second set of corrected line images.

The following description of modes of implementation of the invention is made with reference to the figures which represent in a non-limiting way:

FIG. 1: already described, a schematic representation of a scanning sensor overflying a scene to be observed, FIG. 2: already described, a schematic representation showing the shifts of a line image, FIG. 3: a diagram showing the various steps of a method for estimating shifts in line images according to a preferred mode of implementation of the invention, FIG. 4: a representation of an example of local model of lateral variation of the similarity of line images, FIG. 5: a representation of an example of local model of longitudinal variation of the similarity of line images, FIG. 6: a diagram illustrating the various steps of a method for forming composite images according to the invention.

As described above with reference to FIGS. 1 and 2, line images are acquired by a row of sensitive cells of an optical scanning sensor 10, on board a vehicle flying over a celestial body, and are intended to be juxtaposed in order to form a composite image showing a scene on the surface of the celestial body. In a non-limiting way, the rest of the description considers the case in which the celestial body is the Earth.

The scanning of the plane of sight allows line images corresponding to different portions of the observed scene, i.e. portions that are separate or that overlap at most partially, to be acquired sequentially. Different line images of a composite image therefore show portions of the observed scene that are different.

The scanning of the plane of sight of the sensor 10 is performed, for instance, by moving the vehicle (airplane, drone, helicopter, satellite, etc.) relative to the Earth. According to another example, the scanning of the plane of sight of the sensor 10 is performed by moving said plane of sight relative to the vehicle, i.e. by changing the value of the angle between the line of sight and the Z-axis, for example by means of a scanning mechanism bearing either the sensor 10 or a mirror opposite the sensor 10. This may be the case for an observation satellite in geostationary orbit, stabilized according to three axes.

It is assumed that the pixels of a single line image are acquired simultaneously, or at least in a short enough period of time so that the shifts of a single line image's pixels are insignificant compared to said line image's overall shift. This is the case, for example, if the acquisition frequency of the pixels is significantly higher than the maximum frequency of the vibrations of the sensor 10 (the maximum frequency is the frequency beyond which the magnitude of the movements is negligible in relation to the dimensions of the sensor 10, in practice in the range of a few hundred Hertz to a few thousand Hertz).

The movements of the line of sight are considered to be primarily expressed in the line images by lateral shifts (along the X-axis of the row of sensitive cells of the sensor 10) induced by undesirable rotations of the line of sight about the Y-axis, referred to as "roll rotations", and by longitudinal shifts (along the Y-axis of the travel of the sensor 10) induced by the undesirable rotations of the line of sight around the X-axis, referred to as "pitch rotations". The other disturbances on the line images, for example induced by the rotations of the sensor 10 around the Z-axis, are not considered in the rest of the description.

In addition, the main focus is shifts introduced by high-frequency vibrations, i.e. in the context of the invention above several tens of Hertz (Hz). As described previously, the low-frequency movements (ranging between zero and several tens of Hz) are estimated by other means known to the man skilled in the art, for example from measurements, absolute or relative to a surface S flown over, of the vehicle's displacement and orientation, possibly coupled with measurements of the angle of scan of the instrument line of sight, etc.

This invention relates to a method for estimating shifts of line images and a method for forming composite images from line images with shifts, implemented, for example, by a computing device (microcontroller, computer with a microprocessor, etc.). The computing device comprises storage means (magnetic hard disk, flash memory, optical disk, etc.) on which are stored code instructions to be executed for implementing the steps of a method or methods according to the invention, as well as the line images acquired by the sensor 10. According to some embodiments, the computing device also comprises ASIC, FPGA, etc. types of specialized integrated circuits, designed to implement all or part of the steps of a method or methods according to the invention.

Preferably, in the case of real-time processing the computing device is on-board with the sensor 10 in the vehicle flying over the Earth. In the case of deferred processing, the computing device is either on-board with the sensor 10 in the vehicle, or off-board, i.e. located in an earth station or in a second vehicle flying over the Earth.

Definitions and Notations

The definitions and notations used in the rest of the description are given below. It is understood that the choice of a specific convention, for the purposes of describing embodiments of the invention, does not limit the invention, which could be described equivalently by adopting other conventions without modifying the invention.

A composite image is considered comprising an integer number J of line images $L_i$ (where $1 \leq i \leq J$), acquired at different times, showing portions of the observed scene on the surface S of the Earth that are different. In practice, J is generally greater than several hundred, or even greater than several thousand.

Each line image $L_i$ comprises an integer number N of pixels showing N adjacent areas of the portion observed. $L_i(n)$ designates the pixel with index n (where $1 \leq n \leq N$) in line image $L_i$. In practice, N is generally equal to or greater than several tens of pixels; some applications can go up to several tens of thousands of pixels.

A line image $L_i$ can be considered mathematically as either a function $L_i(x)$ of a variable x, defined for the integer values of x in the interval [1; N], or as a vector of real numbers $[L_i(1), \ldots, L_i(N)]$.

For a given index n, the set of pixels $L_i(n)$ (where $1 \leq i \leq J$) constitutes a column with index n in the composite image. The column of pixels with index n can be considered mathematically as either a function $L_n(n)$ of a variable y, defined for the integer values of y in the interval [1; J], or as a vector of real numbers $[L_1(n), \ldots, L_J(n)]$.

Line image $L_i$ presents a lateral and/or longitudinal shift between the position that line image $L_i$ will occupy in the composite image and the position it should occupy in said composite image, because of the sighting error induced by the undesirable movements in the line of sight of the sensor 10.

The lateral and/or longitudinal shift in line image $L_i$ is expressed in a non-limiting way as a number (integer or real) of pixels.

"Relative (lateral and/or longitudinal) shift" of a line image $L_j$ relative to a line image $L_i$ means the difference between the lateral and/or longitudinal shift in line image $L_j$ and the lateral and/or longitudinal shift in line image $L_i$.

According to the invention, the relative shift of a line image $L_j$ (where $1 \leq j \leq J$) relative to a line image $L_i$, where i is different from j, is estimated by means of at least one local model of variation of the similarity between successive line images, determined by calculating similarity values between different line images of the composite image.

Indeed, although the line images show portions of the observed scene on the surface S of the Earth that are different, in practice, over all or part of the scan swath of the sensor 10, there is a radiometric similarity between successive portions, due to the spatial coherence of the observed scene. In practice, the greater the scan swath of the sensor 10 in relation to the spatial interval between two consecutive portions of the scene, preferably a factor of 100 or more, the more true this is; this is ensured in practice firstly through a sensor comprising a row of at least several tens of sensitive cells, and secondly by configuring the scanning sensor 10 to scan adjacent portions.

A similarity function, designated by R, associates a similarity value $R(L_i,L_j)$ to line images $L_i$ and $L_j$ of the composite image.

The similarity function R can be any function of the line images compared, considered mathematically as vectors, whose maximum is obtained when the said line images are identical, and which decreases as the distance (in the mathematical sense of the term) between said line images increases; the distance between the line images is, for example, the Euclidean distance, or any other distance known to the man skilled in the art.

The similarity function R is, for example, an intercorrelation function, which associates a similarity value to the line images compared that is proportional to their scalar product.

According to another example, the similarity function R is expressed in the form:

$$R(L_i,L_j)=\exp(-\|L_i-L_j\|^2)$$

where $\|x\|$ designates the norm 2 of vector x.

According to another example, the similarity function R is expressed in the form:

$$R(L_i,L_j)=1-\|L_i-L_j\|/(\|L_i\|+\|L_j\|)$$

More generally, the similarity function R between two line images can be calculated not from the full set of pixels of two line images but from a smaller sub-set of pixels, advantageously of the same rank, of said two line images.

Local model of lateral variation of the similarity between different line images means a model showing how the similarity between the different line images of the composite image varies according to the lateral gap between these different line images.

The model of lateral variation of the similarity, local to line image $L_i$, is designated by $R^{lat}_i$. To estimate the relative lateral shift between line images $L_i$ and $L_j$, the local model of lateral variation $R^{lat}_i$ is, for example, the function that associates, to a lateral gap of k pixels, the similarity value $R(L_i,L_j[k])$, designated by $R_{i,j}[k]$, where line image $L_j[k]$ corresponds to line image $L_j$ translated laterally by k pixels relative to $L_i$, such that $L_j[k](n)=L_j(n-k)$.

In the general case, for calculating the similarity value between line images $L_i$ and $L_j[k]$, the two line images must be matched in the sense that the pixels of rank n of the two line images $L_i(n)$ and $L_j[k](n)$ (where $1 \le n \le N$) are aligned along the Y-axis.

Line images $L_i$ and $L_j[k]$ are matched, when k is an integer value, except on the edges of said line images when k is other than zero ($L_j(n-k)$ is not defined if (n−k) is not in the interval [1; N]). In that case, for matching the two line images $L_i$ and $L_j[k]$, line image $L_j$ (and/or line image $L_i$) must be, for example, extrapolated, utilizing methods known to the man skilled in the art, to determine the values of pixels $L_j(n-k)$ not defined beforehand, i.e. for the values of (n−k) not contained in the interval [1; N]. According to a preferred variant, the matching between the two line images is confined to the common sub-sets of pixels and the similarity calculation will be performed on this sub-set.

The lateral translation of line image $L_j$ (considered here as a function), and its matching with other line images, can be generalized to a non-integer number k of pixels.

In this case, the values of pixels $L_j(n-k)$ are not defined, even for values of (n−k) contained in the interval [1; N], because only the values of pixels $L_j(n)$, where n is an integer contained in the interval [1; N], are defined. Line image $L_j$ must, in this case, be re-sampled to determine the values of pixels $L_j(n-k)$ for non-integer values of lateral translation k. The re-sampling of line image $L_j$ (or similarly of line image $L_j[K]$, where K is, for example, the integer portion of k) is performed by utilizing methods known to the man skilled in the art, for example an interpolation of the function $L_j(x)$ for non-integer values of the variable x by a polynomial method (e.g. cubic), truncated Shannon, spline, etc.

Calculating similarity values between line images $L_i$ and $L_j[k]$, and therefore the local model of lateral variation $R^{lat}_i$ of the similarity, can thus be generalized to non-integer values of k, by performing a re-sampling and a matching of line image $L_j[k]$ with line image $L_i$.

Local model of longitudinal variation of the similarity between different line images means a model showing how the similarity between different line images varies according to the longitudinal gap between these different line images.

The model of longitudinal variation of the similarity, local to line image $L_i$, is designated by $R^{long}_i$. The local model of longitudinal variation $R^{long}_i$ is, for example, the function that associates, to a longitudinal gap of m pixels, the similarity value $R(L_i, L_{i+m})$ of line image $L_i$ and line image $L_{i+m}$. The model can be calculated for integer values of m and be generalized to non-integer values, for example by interpolation.

Method for Estimating Shifts in Line Images

The estimation method mainly comprises a step of estimating the relative lateral and/or longitudinal shift of a line image $L_j$ of the composite image relative to a line image $L_i$ of the composite image by means of a local model of lateral and/or longitudinal variation of the similarity.

Preferably, the estimation method also comprises a step of integrating relative lateral and/or longitudinal shifts in successive line images so as to determine shifts, referred to as "cumulative shifts", relative to a same line image, referred to as the "reference line image".

Preferably, the estimation method also comprises a step of low-cut filtering of lateral and/or longitudinal shifts, performed before, at the same time as or after the previous integration step, so as to completely or partially remove the low-frequency deviation in the estimation of relative or cumulative shifts.

The different steps of the estimation method are described below in the context of the description of a preferred mode of implementation of the estimation method, given as a non-limiting example of the invention, in which the method is implemented for estimating both lateral shifts and longitudinal shifts.

The preferred mode of implementation of the method, described below, mainly comprises the following steps, shown schematically in FIG. 3:

step 20 of estimating lateral shifts,
step 21 of integrating lateral shifts,
step 22 of filtering lateral shifts,
step 23 of estimating longitudinal shifts,
step 24 of integrating longitudinal shifts,
step 25 of filtering longitudinal shifts.

a) Step 20: Estimating Lateral Shifts

Step 20 of estimating lateral shifts is described in the context of estimating the relative lateral shift of a line image $L_j$ of the composite image relative to a line image $L_i$ of the composite image (where $1 \le j \ne i \le J$).

Preferably, the line images considered are consecutive line images, e.g. j=i+1. This example does not limit the invention, which can be implemented by considering line images of the composite image that are not immediately consecutive, subject to there being a similarity between said two line images, which must be verified on a case by case basis depending on the type of scene observed.

The relative lateral shift $\delta_{i+1}$ of line image $L_{i+1}$, relative to line image $L_i$, is estimated by means of a model $R^{lat}_i$, local to line images $L_i$ and $L_{i+1}$, of lateral variation of the similarity between different line images of the composite image.

The model $R^{lat}_i$ is determined by calculating the similarity values $R^{lat}_i(k) = R_{i,i+1}[k]$ for a plurality of lateral translation values k.

The assumption is then made that the similarity between line images $L_i$ and $L_{i+1}$ is maximum when no disturbance has affected the taking of image $L_{i+1}$ with respect to the taking of image $L_i$, and that it diminishes as the absolute value of k increases. The relevance of this assumption improves as the radiometric similarity between the line images (not disturbed) increases, due to the spatial coherence of the observed scene and because the scan swath of the sensor 10 is large.

From this assumption, the relative lateral shift $\delta_{i+1}$ of line image $L_{i+1}$, relative to line image $L_i$, is then estimated as the lateral translation k for which the value of the local model of lateral variation $R^{lat}_i$ is maximum:

$$\delta_{i+1} = \arg(\max_k(R^{lat}_i(k))).$$

FIG. 4 shows an example of a local model of lateral variation $R^{lat}_i$, and the lateral shift $\delta_{i+1}$, obtained for the maximum value of said model, designated by "max".

The search for the lateral translation k for which the value of the local model of lateral variation $R^{lat}_i$ is maximum is performed, according to the implementation chosen, either by limiting it to relative integer values of lateral translation k, or for real values.

If it is limited to integer values of k, similarity values $R_{i,i+1}[k]$ of line images $L_{i+1}$ and $L_i$ are calculated for a plurality of integer values of lateral translation k, preferably all integer values contained in an interval $[-K_1; K_2]$, where $K_1$ and $K_2$ are integers or real positive numbers of pixels, preferably about a dozen. The similarity values $R_{i,i+1}[k]$ calculated in this way form the local model of lateral variation $R^{lat}_i$ of the similarity. The integer value of k, for which the value of the local model of lateral variation $R^{lat}_i$ is maximum is then calculated, over this set of values.

Where appropriate, the values of the local model of lateral variation $R^{lat}_i$ for real values of lateral translation k are equal to the similarity values $R_{i,i+1}[k]$ determined either by re-sampling line image $L_{i+1}$ prior to calculating similarity value $R_{i,i+1}[k]$, or by interpolation of the local model of lateral variation $R^{lat}_i$ from the values $R_{i,i+1}[k]$ calculated for integer values of k.

The interpolation can be performed according to any method allowing the values of a function to be estimated from a discrete set of known values, such as, for example, linear or polynomial interpolation, or least squares approximation, in which case the interpolated function does not necessarily pass through all the points $(k, R_{i,i+1}[k])$ calculated.

According to a variant, values $R^{lat}_i(k)$ of the local model of lateral variation are calculated for a finite set of real values of k over the interval $[-K_1; K_2]$. For example, all values of k in this interval that are multiples of 0.2 pixels are considered. Then, over this set of values, the value of k for which the value of said model is maximum is determined.

According to another variant, the search for the maximum is performed by dichotomy. For example, with reference to FIG. 4, the values $R^{lat}_i(k)$ of the local model of lateral variation $R^{lat}_i$ are calculated for integer values of k ranging from −3 to +3. It then appears that the maximum of the model that would be interpolated for non-integer values of k would be somewhere between 0 and +1. The value $R^{lat}_i(1/2)$ of the model is then calculated as the similarity value $R_{i,i+1}[1/2]$, calculated as a function of $L_{i+1}[1/2]$ (obtained by re-sampling $L_{i+1}$) and $L_i$. The values $R^{lat}_i(k)$ for k equal to 0, 1/2 and 1 are then compared to find out in which interval, [0, 1/2] or [1/2, 1], the maximum of the local model of lateral variation $R^{lat}_i$ is located, then the search by dichotomy is continued by iteratively reducing the search interval by a factor of 2 each time.

It is understood that any method of finding the maximum can be implemented in step 20 of the estimation method, and that the choice of a specific method of finding the maximum is only a variant of implementation of the estimation method according to the invention.

During step 20 of estimating relative lateral shifts, the relative lateral shifts are estimated for a plurality of line images. It is considered, in a non-limiting way, that the relative lateral shift is estimated for each line image with index from 2 to J relative to the previous line image in the composite image.

b) Step 21: Integrating Lateral Shifts

Step 21 of integrating relative lateral shifts $\delta_{i+1}$, where $1 \leq i \leq J-1$, estimated during the previous step 20, aims at determining cumulative lateral shifts relative to a reference line image of the composite image, in the example considered here line image $L_1$. This is advantageous for the re-sampling necessary for matching all the line images, in order to form the composite image.

During the step of integrating relative lateral shifts $\delta_{i+1}$, where $1 \leq i \leq J-1$, said relative lateral shifts are, for example, added, and the cumulative lateral shifts obtained, designated by $\delta'_i$, where $1 \leq i \leq J$, can be expressed by recurrence as follows:

$$\delta'_1 = 0,$$

$$\delta'_{i+1} = \delta'_i + \delta_{i+1}, \text{ where } 1 \leq i \leq J-1.$$

c) Step 22: Filtering Lateral Shifts

The cumulative lateral shifts $\delta'_i$, where $1 \leq i \leq J$, are filtered by means of a low-cut filter.

The purpose of this filtering step 22 is to completely or partially remove the low-frequency variations of the cumulative lateral shifts; low-frequency variations which, firstly, are assumed to be estimated by other means when they are induced by sighting errors and, secondly, can originate from variations in the observed scene and not from sighting errors.

In a preferred mode of implementation, the filter is a band-pass filter, i.e. both low-cut and high-cut. In this case the high-frequency variations are also completely or partially removed, because they correspond in practice mainly to measurement noise rather than sighting errors of the sensor 10.

In the case considered here, where the scan swath of the sensor 10 is large compared to the spatial interval between two successive portions of the scene observed, the parameters of the filter applied can be expressed in pixels.

Preferably, the low cutoff frequency, designated by $f_{min}$, is such that $1/f_{min}$ is between several tens of pixels and several hundreds of pixels. In the case of a band-pass filter, the high cutoff frequency, designated by $f_{max}$, is preferably such that $1/f_{max}$ is some several pixels.

The cumulative lateral shifts, after filtering, of line images $L_i$ are designated by $\delta''_i$, where $1 \leq i \leq J$.

The filtering can be performed in the time domain or frequency domain. When the calculations are performed in deferred processing, a Fourier transform of the set of cumulative lateral shifts $\delta'_i$, for example, can be used to move to the frequency domain.

As indicated previously, filtering step 22 is performed either before, at the same time as or after step 21 of integrating lateral shifts.

d) Step 23: Estimating Longitudinal Shifts

Step 23 of estimating longitudinal shifts is described in the context of estimating the relative lateral shift of a line image $L_j$ of the composite image relative to a line image $L_i$ of the composite image (where $1 \leq j \neq i \leq J$).

As above in step 20 of estimating relative lateral shifts, the line images considered are preferably, but not necessarily, consecutive line images of the composite image, and it is considered, in a non-limiting way, that $j = i+1$.

In a preferred mode of implementation, considered in the rest of the description, step 23 of estimating relative longitudinal shifts is applied taking into account 231 relative lateral shifts, when they have already been estimated, to correct beforehand the line images $L_i$ for said estimated relative lateral shifts. In this preferred mode, step 23 is performed on line images $L'_i$ corresponding to the line images $L_i$ corrected for said estimated relative lateral shifts. The correction is performed by laterally translating the line images $L_i$ by said estimated lateral shifts, a translation that is accompanied, where necessary, by an interpolation and/or re-sampling. Therefore, for executing step 23 of estimating relative longitudinal shifts, line images $L'_i$ corresponding to line images $L_i[\delta'_i]$ or, preferably, to line images $L_i[\delta''_i]$, where $1 \leq i \leq J$, advantageously matched by re-sampling, are considered.

It will be noted that the following equations, with respect to step 23 of estimating relative longitudinal shifts, are applied in the same way in the case where the step is applied without previously correcting for lateral shifts, by directly considering line images $L_i$, where $1 \leq i \leq J$.

The relative longitudinal shift $\Delta_{i+1}$ of line image $L'_{i+1}$, relative to line image $L'_i$, is estimated by determining a model $R^{long}_i$, local to line images $L'_i$ and $L'_{i+1}$, of longitudinal variation of the similarity of different line images of the composite image.

In a preferred mode of implementation, the local model of longitudinal variation of the similarity, relative to line image $L_i$, is determined as described below.

The local model of longitudinal variation $R^{long}_i$ is preferably determined for longitudinal gap values m of successive line images contained in an interval $[0; M]$, where M is an integer or positive real number of pixels greater than one, preferably equal to or greater than two.

The integer values of longitudinal gap m, expressed in pixels, correspond to the theoretical longitudinal gap between two successive line images $L'_i$ and $L'_{i+m}$ separated by m acquisition periods. This longitudinal gap is theoretical because said line images present in practice longitudinal shifts due in particular to undesirable pitch movements of the line of sight of the sensor 10 during the acquisition.

The values $R^{long}_i(m)$ of the model for integer values of m are determined preferably using similarity values $R_{q,q+m}[0]$, i.e. the similarity value of line images $L'_q$ and $L'_{q+m}$ matched without lateral translation. The similarity values $R_{q,q+m}[0]$ are calculated for each integer q contained in a local interval $[i-Q_1; i+Q_2]$, where $Q_1$ and $Q_2$ are two positive integers or zero, at least one of which is strictly positive. For example, the values $R^{long}_i(m)$ of the model are expressed in the form:

$$R^{long}_i(m) = (1/(Q_1+Q_2+1))(\Sigma_{q \in [i-Q1; i+Q2]} R_{q,q+m}[0])$$

where the number of averaged similarity values $(Q_1+Q_2+1)$ is preferably about a dozen, possibly a hundred.

According to a particular mode of implementation, the average of the similarity values $R_{q,q+m}[0]$ is weighted, with weighting coefficients $\alpha_q$. Preferably, the weighting coefficients $\alpha_q$ decrease the farther q is from i. In this case, the values $R^{long}_i(m)$ of the model are expressed in the form:

$$R^{long}_i(m) = (1/(\Sigma_{q \in [i-Q1; i+Q2]} \alpha_q))(\Sigma_{q \in [i-Q1; i+Q2]} \alpha_q R_{q,q+m}[0])$$

Preferably, the values $R^{long}_i(m)$ of the model are calculated in this way for all the integer values of m in the interval $[0; M]$.

Values $R^{long}_i(m)$ of the model for real values of m are then determined by interpolation. The interpolation can be performed by implementing any method known to the man skilled in the art, such as, for example, linear or polynomial interpolation, or least squares approximation, etc.

FIG. 5 shows an example of a local model of longitudinal variation of the similarity of successive line images of the composite image.

By definition, the local model $R^{long}_i$ is maximum for m equal to zero as the similarity is maximum when the line images are identical, which is the case when m is equal to zero, since the similarity of line image $L_i$ to itself is being evaluated. In addition, it can be expected that the local model of variation of similarity decreases as m increases, because the greater the longitudinal gap between line images, the farther apart the portions they show in the observed scene are.

To estimate the relative longitudinal shift $\Delta_{i+1}$, the similarity value $R_{i,i+1}[0]$ of line images $L'_{i+1}$ and $L'_i$ is calculated.

The longitudinal gap, not necessarily integer, corresponding to the similarity value $R_{i,i+1}[0]$ is then determined from the local model of longitudinal variation of the similarity of successive line images of the composite image.

As shown in FIG. 5, the relative longitudinal shift $\Delta_{i+1}$ is estimated as the difference between the longitudinal gap (designated in FIG. 5 by "$M_0$") determined for similarity value $R_{i,i+1}[0]$ (designated in FIG. 5 by "$V_0$"), based on the local model of longitudinal variation of the similarity, and the theoretical longitudinal gap of line images $L'_{i+1}$ and $L'_i$ (i.e. 1 in the case assumed here of two successive line images).

To calculate $M_0$, an inverse function of interpolated, possibly piecewise, function $R^{long}_i$ can be determined and its value $M_0$ can be calculated in $R_{i,i+1}[0]$.

According to a variant, values $R^{long}_i(m)$ are calculated for a plurality of real values of m in $[0; M]$, for example multiples of 0.2 pixels, from the interpolated model, and the value $M_0$ of m is determined for which the values $R^{long}_i(m)$ and $R_{i,i+1}[0]$ are closest. Advantageously, in addition the estimation of $M_0$ can be refined by dichotomy.

It is understood that any method of finding the longitudinal gap corresponding to the similarity value $R_{i,i+1}[0]$ can be implemented, and that a specific choice is only a variant of implementation of the estimation method according to the invention.

Preferably, the local model of longitudinal variation of the similarity is updated for each line image $L_{i+1}$ for which one seeks to estimate the relative longitudinal shift $\Delta_{i+1}$. According to other examples, advantageous with regard to the amount of operations to be performed, the same model is used for a plurality of successive line images, so that the update frequency for said model is reduced compared to the case of one update for each line image.

During step 23 of estimating longitudinal shifts, the relative longitudinal shifts are estimated for a plurality of line images. It is considered, in a non-limiting way, that the relative longitudinal shift is estimated for each line image with index from 2 to J relative to the previous one.

It should be noted that, in the case where the low-frequency movements of the vehicle and/or of the line of sight undergo a major acceleration, the acquisition lag may no longer be substantially constant during the acquisition, so that the physical dimension of the pixels varies in the longitudinal direction.

In a particular mode of implementation of step 23, the calculation of the local model $R^{long}_i$ of longitudinal variation of the similarity takes these variations into account when they are known. For example, the dimension of the pixels of a line image $L'_{q0}$, where q0 is in $[i-Q_1; i+Q_2]$, are considered to be the reference longitudinal dimension of the pixels. The longitudinal dimensions of the pixels of other lines where q is in $[i-Q_1; i+Q_2]$, are expressed as multiples, not necessarily integer, of the reference longitudinal dimension; the multiplier coefficients are the ratio between the physical longitudinal dimensions of the pixels of line images $L'_q$ and the reference longitudinal dimension. In this case, the theoretical longitudinal gaps m'(q) between line images $L'_q$ and $L'_{q+}$, are not necessarily whole numbers and can vary substantially when q varies. Then, the similarity functions $R_{q,q+m}[0]$ of lines $L'_q$ and $L'_{q+m}$, where q is in $[i-Q_1; i+Q_2]$ and m belongs to $[0; M]$, are calculated. Average value calculations are not suitable for calculating the local model of longitudinal variation of the similarity, because in this case m'(q) is variable. In a variant of the method, for each integer value of m in $[0; M]$ a barycentric calculation of the points (m'(q), $R_{q,q+m}[0]$) obtained for all the values of q contained in $[i-Q_1; i+Q_2]$ is performed, then the barycenters obtained in this way are interpolated to obtain the local model $R^{long}_i$ of longitudinal variation of the similarity. In another variant, the local model of longitudinal variation of the similarity is determined as the least squares curve passing in the vicinity of all the points (m'(q), $R_{q,q+m}[0]$) calculated.

e) Step 24: Integrating Longitudinal Shifts

As for the lateral shifts, the relative longitudinal shifts are integrated in order to obtain cumulative longitudinal shifts relative to a reference line image of the composite image, in the example considered here line image $L_1$.

During the step of integrating relative longitudinal shifts $\Delta_{i+1}$, where $1 \le i \le J-1$, said relative longitudinal shifts are, for example, added. The cumulative longitudinal shifts obtained, designated by $\Delta'_i$, where $1 \le i \le J$, can be expressed by recurrence as follows:

$$\Delta'_1 = 0,$$

$$\Delta'_{i+1} = \Delta'_i + \Delta'_{i+1}, \text{where } 1 \le i \le J-1.$$

f) Step 25: Filtering Longitudinal Shifts

As for the cumulative lateral shifts, the cumulative longitudinal shifts $\Delta'_i$, where $1 \leq i \leq J$, are filtered by means of a low-cut filter.

Preferably, the filter is a band-pass filter.

Preferably, the filter used is the same as that used for filtering cumulative lateral shifts, defined by the same low cutoff frequency $f_{min}$ and, where appropriate, the same high cutoff frequency $f_{max}$.

The cumulative longitudinal shifts, after filtering, of line images $L_i$ are designated by $\Delta''_i$, where $1 \leq i \leq J$.

As indicated previously, filtering step 25 is performed either before, at the same time as or after step 24 of integrating longitudinal shifts.

g) Additional remarks

In a particular mode of implementation, at least one additional iteration of the different stages of the estimation method is performed, applying the estimation method again to line images corrected for shifts estimated during the previous iteration of the estimation method.

More generally, it will be noted that the different steps of the estimation method according to the invention, in particular step 20 of estimating relative lateral shifts and/or step 23 of estimating relative longitudinal shifts, can be implemented on sub-sets of pixels of line images $L_i$, where $1 \leq i \leq J$.

According to a variant, the selection of this sub-set is arbitrary, and mainly aims to reduce the number of calculations needed, in particular extrapolation calculations for line images on the edges in order to calculate similarity values. For example, it is possible to only retain the $N-K_1-K_2$ central pixels, defined for all the values of lateral translation k in $[-K_1; K_2]$.

According to another variant, the selection is made according to a scene content criterion. For example, one or more, preferably adjacent, sub-sets of pixels with indices {n1, n2, ..., nA}, where A is less than N, can be selected for which the content presents a variance above a given threshold, or for which the content presents the maximum variance; the variance is, for example, calculated according to the expression:

$$\Sigma_i(\Sigma_{n' \in \{n1, \ldots, nA\}} |L_i(n')|^2 - \Sigma_{n \in \{n1, \ldots, nA\}} |L_i(n)|^2|).$$

Method for Forming Composite Images

This invention also relates to a method for forming a composite image from line images $L_i$, where $1 \leq i \leq J$, with lateral and/or longitudinal shifts, acquired previously by a sensor 10, on board a vehicle flying over the Earth.

In a preferred mode of implementation the formation method mainly comprises the following steps, shown in FIG. 6:

a step 30 of estimating shifts in line images $L_i$,
a step 31 of correcting estimated shifts,
a step 32 of juxtaposing corrected line images.

Step 30 of estimating shifts in line images implements the estimation method according to the invention to determine lateral and/or longitudinal shifts in line images $L_i$, where $1 \leq i \leq J$. In the rest of the description, the case is considered, in a non-limiting way, in which both lateral and longitudinal shifts are estimated and corrected.

Preferably, the estimation method is implemented for estimating the cumulative shifts after filtering, i.e. the lateral shifts $\delta''_i$ and the longitudinal shifts $\Delta'_i$, where $1 \leq i \leq J$.

Once the lateral and longitudinal shifts have been estimated, line images $L_i$, where $1 \leq i \leq J$, are corrected during correction step 31.

The correction is preferably performed in two stages: advantageously, first lateral shifts are corrected, and then longitudinal shifts are corrected.

Lateral shifts are corrected by re-sampling line images $L_i$, where $1 \leq i \leq J$. As described previously, the re-sampling is performed for example by interpolation and is accompanied, where appropriate, by extrapolation at the edges.

Line image $L'_i$ after the lateral shift is corrected corresponds to line image $L_i[\delta''_i]$, where $1 \leq i \leq J$.

Longitudinal shifts are corrected by re-sampling each column $L'_i(n)$ (where 11 J) with index n of the composite image, where $1 \leq n \leq N$ (here a column is considered mathematically as a function). This re-sampling is performed by implementing interpolation methods known to the man skilled in the art, such as a cubic interpolation, truncated Shannon, or using splines, etc.

Thus, for a given index n, the values of pixels $L'_i(n)$ (where $1 \leq i \leq J$) correspond in fact to values for indices $(i+\Delta''_i)$, where $1 \leq i \leq J$, because of the longitudinal shifts. For the juxtaposition, said values of pixels must be reassigned to indices i, where $1 \leq i \leq J$. For example, a function $L'_y(n)$ is calculated, by interpolating values of pixels $L'_i(n)$, considered with indices $(i+\Delta''_i)$ (where $1 \leq i \leq J$), for real values of y contained in interval $[1; J]$, and, if necessary, by extrapolation for values of y outside interval $[1; J]$. The values of pixels in the column with index n, for indices i, where $1 \leq i \leq J$, designated by $L''_i(n)$, are determined as the values taken by function $L'_y(n)$ for y equal to i, where $1 \leq i \leq J$. The values $L''_i(n)$, where $1 \leq n \leq N$, constitute the line image with index i after longitudinal shift $\Delta''_i$ is corrected.

The following step 32 consists of juxtaposing the line images thus corrected to form the composite image.

In a variant of the formation method according to the invention, not shown in the figures, the lateral and longitudinal shifts estimated in step 30 are used to estimate the lateral and longitudinal shifts of a second set of line images, acquired by a row of sensitive cells of a second sensor on board the same vehicle as the first sensor 10, on the assumption in which the second sensor is substantially subjected to the same vibrations as the first sensor 10 (which is generally the case when they are co-localized and/or their focal planes coincide).

In this case the formation method comprises a step of converting estimated shifts, aimed at determining a second set of lateral and longitudinal shifts for the second set of line images from those estimated for the first set of line images $L_i$, where $1 \leq i \leq J$.

The conversion step consists, for example, of reconstituting the roll and pitch rotations at the origin of the shifts in the first set of line images $L_i$, where $1 \leq i \leq J$, and then determining, according to said roll and pitch rotations, the shifts induced in the second sensor. These operations implement trigonometric calculations known to the man skilled in the art, and in particular take into account the vehicle's altitude relative to the surface S of the Earth, the dimensions of the first sensor 10 and of the second sensor, etc.

Once the shifts in the second set of line images have been determined, a composite image is formed by executing correction step 31 and juxtaposition step 32 for respectively correcting and juxtaposing the second set's line images.

It should be noted that the formation method according to the invention comprises, according to other modes of implementation, additional steps, such as steps aimed at correcting the composite image, fully or partially, for the geometric distortion effects introduced by the low-frequency movements of the vehicle and/or the line of sight. Such low-frequency movements are for example estimated using conventional means, as for example sensors on board the vehicle (position, speed, angular and linear acceleration sensors) and/or the use of landmarks (recognizable points whose position on the Earth's surface is known).

This invention finds a particularly advantageous application in the field of the exploitation of images obtained by scanning sensors on board vehicles flying over the Earth. In particular, through appropriate real-time or deferred processing, the invention makes it possible to correct geometric deformations in a composite image induced by high-frequency vibrations of the sensor during the acquisition of line images forming said composite image.

In particular, the invention makes it possible to estimate the lateral and/or longitudinal shifts between different line images of the same composite image without needing to have at least two composite images showing the same portion of the observed scene, as it is the case in the prior state of the art.

The invention claimed is:

1. An estimation method for estimating shifts of line images of an image, referred to as a "composite image", made up of the juxtaposition of J line images, in which:
   the line images show portions of a scene on the surface (S) of a celestial body that are different and successively acquired by a row of sensitive cells of a sensor (10) on board a vehicle flying over said celestial body, each line image being composed of a plurality of pixels, and
   a line image $L_j$, where $1 \leq j \leq J$, presents a lateral and/or longitudinal shift between the position that line image $L_j$ is destined to occupy in the composite image and the position it should occupy, because of a sighting error of the sensor (10) during the acquisition of line image $L_j$,
   wherein the lateral and/or longitudinal shift of a line image $L_j$ relative to a line image $L_i$, where j is different from i, is estimated according to a local model of lateral and/or longitudinal variation of the similarity between different line images,
   wherein the local model of lateral and/or longitudinal variation of the similarity between different line images is determined by calculating similarity values between different line images of the composite image,
   a step (20) of estimating the relative lateral shift $\delta_j$ of line image $L_j$ relative to line image $L_i$, during which the local model of lateral variation of the similarity between successive line images is determined by calculating similarity values of line image $L_j$ to line image $L_i$ for a plurality of lateral translation values of one line relative to the other,
   the relative lateral shift $\delta_j$ is estimated as the lateral translation for which the value of the model of lateral variation of the similarity is maximum, and
   a step (21) of integrating relative lateral shifts $\delta_j$ in successive line images, for determining cumulative lateral shifts $\delta'_j$ with respect to a reference line image of the composite image.

2. The estimation method according to claim 1, comprising a step (22) of low-cut filtering of relative lateral shifts $\delta_j$ or cumulative lateral shifts $\delta'_j$.

3. An estimation method for estimating shifts of line images of an image, referred to as a "composite image", made up of the juxtaposition of J line images, in which:
   the line images show portions of a scene on the surface (S) of a celestial body that are different and successively acquired by a row of sensitive cells of a sensor (10) on board a vehicle flying over said celestial body, each line image being composed of a plurality of pixels, and
   a line image $L_j$, where $1 \leq j \leq J$, presents a lateral and/or longitudinal shift between the position that line image $L_j$ is destined to occupy in the composite image and the position it should occupy, because of a sighting error of the sensor (10) during the acquisition of line image $L_j$,
   wherein the lateral and/or longitudinal shift of a line image $L_j$ relative to a line image $L_i$, where j is different from i, is estimated according to a local model of lateral and/or longitudinal variation of the similarity between different line images,
   a step (23) of estimating the relative longitudinal shift $\Delta_j$ of line image $L_j$ relative to line image $L_i$, during which a similarity value is calculated for line image $L_j$ and line image $L_i$, and the relative longitudinal shift $\Delta_j$ is estimated according to a longitudinal gap corresponding, based on the local model of longitudinal variation of the similarity, to said similarity value for line image $L_j$ and line image $L_i$,
   wherein when lateral shifts have already been estimated, the step (23) of estimating the relative longitudinal shift $\Delta_j$ is applied to line images $L'_j$ instead of line images $L_j$, where $1 \leq j \leq J$, said line images $L'_j$ corresponding to lines images $L_j$ after said estimated lateral shifts have been corrected.

4. An estimation method for estimating shifts of line images of an image, referred to as a "composite image", made up of the juxtaposition of J line images, in which:
   the line images show portions of a scene on the surface (S) of a celestial body that are different and successively acquired by a row of sensitive cells of a sensor (10) on board a vehicle flying over said celestial body, each line image being composed of a plurality of pixels, and
   a line image $L_j$, where $1 \leq j \leq J$, presents a lateral and/or longitudinal shift between the position that line image $L_j$ is destined to occupy in the composite image and the position it should occupy, because of a sighting error of the sensor (10) during the acquisition of line image $L_j$,
   wherein the lateral and/or longitudinal shift of a line image $L_j$ relative to a line image $L_i$, where j is different from i, is estimated according to a local model of lateral and/or longitudinal variation of the similarity between different line images,
   a step (23) of estimating the relative longitudinal shift $\Delta_j$ of line image $L_j$ relative to line image $L_i$, during which a similarity value is calculated for line image $L_j$ and line image $L_i$, and the relative longitudinal shift $\Delta_j$ is estimated according to a longitudinal gap corresponding, based on the local model of longitudinal variation of the similarity, to said similarity value for line image $L_j$ and line image $L_i$,
   wherein the local model of longitudinal variation of the similarity between successive line images is calculated, for a given theoretical longitudinal gap between two line images, by averaging similarity values calculated for a plurality of pairs of line images of the composite image separated by said given theoretical longitudinal gap.

5. The estimation method according to claim 4, in which the local model of longitudinal variation of the similarity between successive line images is calculated between the theoretical longitudinal gaps by interpolation according to values calculated for the theoretical longitudinal gaps.

6. An estimation method for estimating shifts of line images of an image, referred to as a "composite image", made up of the juxtaposition of J line images, in which:
   the line images show portions of a scene on the surface (S) of a celestial body that are different and successively acquired by a row of sensitive cells of a sensor (10) on board a vehicle flying over said celestial body, each line image being composed of a plurality of pixels, and
   a line image $L_j$, where $1 \leq j \leq J$, presents a lateral and/or longitudinal shift between the position that line image $L_j$ is destined to occupy in the composite image and the position it should occupy, because of a sighting error of the sensor (10) during the acquisition of line image $L_j$, wherein the lateral and/or longitudinal shift of a line image $L_j$ relative to a line image $L_i$, where j is different from i, is estimated according to a local model of lateral and/or longitudinal variation of the similarity between different line images, a step (23) of estimating the relative longitudinal shift $\Delta_j$ of line image $L_j$ relative to line image $L_i$, during which a similarity value is calculated for line image $L_j$ and line image $L_i$, and the relative longitudinal shift $\Delta_j$ is estimated according to a longitudinal gap corresponding, based on the local model of longitudinal variation of the similarity, to said similarity value for line image $L_j$ and line image $L_i$, and a step (24) of integrating relative longitudinal shifts $\Delta_j$ in successive line images for determining cumulative longitudinal shifts $\Delta'_j$ with respect to a reference line image of the composite image.

7. The estimation method according to claim 6, comprising a step (25) of low-cut filtering of relative or cumulative longitudinal shifts.

8. A method for forming composite images using line images with shifts, comprising:

a step (30) of estimating shifts of a first set of line images acquired by a first sensor (10), utilizing an estimation method for estimating shifts of line images of an image, referred to as a "composite image", made up of the juxtaposition of J line images, in which:

the line images show portions of a scene on the surface (S) of a celestial body that are different and successively acquired by a row of sensitive cells of a sensor (10) on board a vehicle flying over said celestial body, each line image being composed of a plurality of pixels, and a line image Lj, where 1≤j≤J, presents a lateral and/or longitudinal shift between the position that line image Lj is destined to occupy in the composite image and the position it should occupy, because of a sighting error of the sensor (10) during the acquisition of line image Lj, wherein the lateral and/or longitudinal shift of a line image Lj relative to a line image Li, where j is different from i, is estimated according to a local model of lateral and/or longitudinal variation of the similarity between different line images, a step of converting estimated shifts in a second set of shifts for a second set of line images, acquired by a second sensor on board the vehicle and substantially subjected to the same sighting errors as the first sensor (10), a step (31) of correcting the second set of shifts of the second set of line images, and a step (32) of juxtaposing the second set of corrected line images.

\* \* \* \* \*